(12) United States Patent
Simakov et al.

(10) Patent No.: US 7,530,878 B2
(45) Date of Patent: May 12, 2009

(54) GRINDING MACHINE WITH A CONCENTRICITY CORRECTION SYSTEM

(75) Inventors: Mikail Simakov, Victoria (AU); Christian Dilger, Leinfelden-Echterdingen (DE)

(73) Assignee: Walter AG, Tubengen, Deleware (DE)

( * ) Notice: Subject to any disclaimer, the term of this patent is extended or adjusted under 35 U.S.C. 154(b) by 0 days.

(21) Appl. No.: 10/572,209

(22) PCT Filed: Sep. 23, 2004

(86) PCT No.: PCT/EP2004/010660

§ 371 (c)(1),
(2), (4) Date: Dec. 21, 2006

(87) PCT Pub. No.: WO2005/030437

PCT Pub. Date: Apr. 7, 2005

(65) Prior Publication Data

US 2007/0082580 A1    Apr. 12, 2007

(30) Foreign Application Priority Data

Sep. 23, 2003   (DE) ................................ 103 44 293

(51) Int. Cl.
*B24B 49/12* (2006.01)

(52) U.S. Cl. ................................. 451/5; 451/6; 451/49
(58) Field of Classification Search .................... 451/5, 451/8, 9, 10, 6, 49, 28
See application file for complete search history.

(56) References Cited

U.S. PATENT DOCUMENTS

| | | | |
|---|---|---|---|
| 6,411,861 B1* | 6/2002 | Clewes et al. | 700/164 |
| 6,729,936 B1* | 5/2004 | Hori et al. | 451/8 |

FOREIGN PATENT DOCUMENTS

| | | |
|---|---|---|
| DE | 197 53 426 | 6/1999 |
| EP | 0 611 630 | 8/1994 |
| WO | 2004/052592 | 6/2004 |

* cited by examiner

*Primary Examiner*—Robert Rose
(74) *Attorney, Agent, or Firm*—Goodman Allen & Filetti, PLLC; Charles M. Allen; Thedford I. Hitaffer

(57) ABSTRACT

A tool grinding machine has a machine control unit, which by means of a suitable measuring device, which for instance comprises a tracer (9) and a measuring module, first determines the wobble runout with respect to the ideal receptacle axis (C) of a workpiece receptacle. In the grinding machining of the blank (7) or a workpiece, this wobble runout is taken into account and compensated for; that is, the grinding tools are made to trace a tumbling workpiece in such a way that the workpiece is machined to the exact intended dimensions and concentrically.

17 Claims, 2 Drawing Sheets

GRINDING MACHINE WITH A CONCENTRICITY CORRECTION SYSTEM

Figure 1:
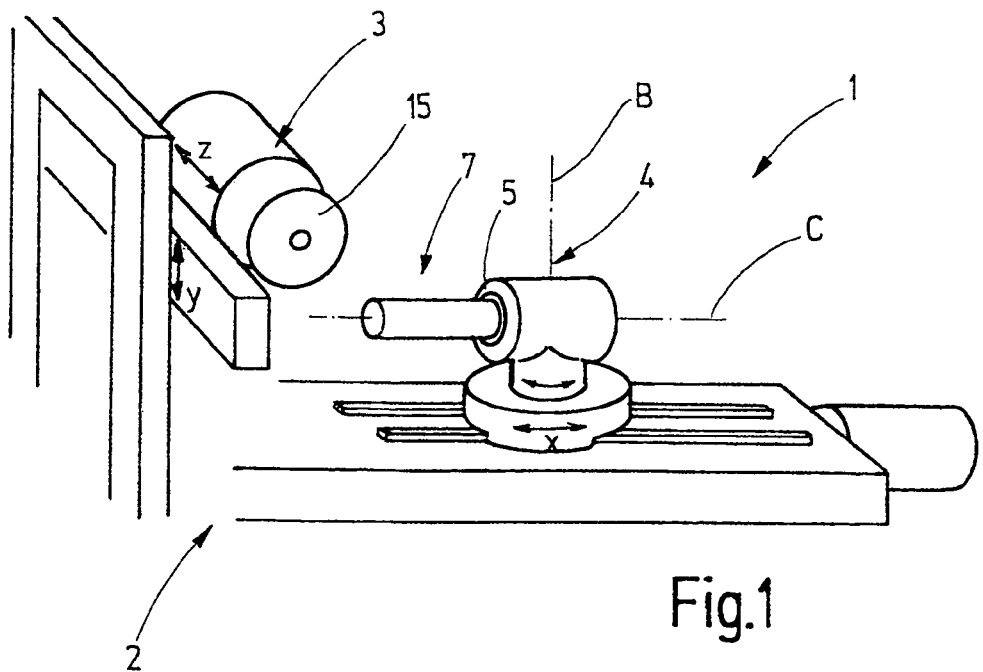

With grinding machines, especially tool grinding machines, high accuracy must now be attained, which makes stringent demands in terms of precision on all the machine elements involved, especially with regard to the bearing and guidance of the workpiece as well as the bearing and guidance of the grinding head. Inaccurate chucks represent a considerable problem in this respect.

With this as the point of departure, it is the object of the invention to create a grinding machine, in particular a tool grinding machine, with which tools can be made with highly accurate concentricity in a simple and reliable way.

This object is attained according to claims 1 and 8 with a grinding machine which performs the required grinding machining on the basis of a coordinate system defined by the clamped workpiece. This can be done either by working directly with tool coordinates, or, which is preferred, by first determining the location and orientation of the workpiece coordinate system by means of a measurement and then converting this workpiece coordinate system to the machine coordinate system by means of a kinematic transformation. For the kinematic transformation, a transformation matrix is used, which is obtained from the orientation of the workpiece and its coordinate system within the machine coordinate system. As a result, the machine control unit takes a virtually arbitrary misorientation of the workpiece in the machine coordinate system into account. If the machine coordinates for instance include Cartesian coordinates x, y, z, which characterize a relative motion between the grinding wheel and the workpiece, as well as one or more pivot axes about which the grinding head and/or the workpiece holder is to be pivoted, then in addition to the machine coordinates a receptacle axis of the workpiece receptacle is used, which describes a rotation of the workpiece receptacle about the longitudinal direction of the workpiece to be clamped. The machine coordinate system thus in the most general case has six degrees of freedom; that is, it has three linear axes and two pivot axes as well as one rotary axis. This last axis is formed by the receptacle axis.

The tool coordinate system is for instance a Cartesian or a polar coordinate system. This system is designed such that at least one axis forms the axis of symmetry of the preferably cylindrical blank. This coordinate direction, also called the workpiece axis, is determined in a first measurement step. This is done in the machine coordinate system by means of a suitable measuring device, such as an optical measuring device or a mechanical tracer, which traces the blank, which initially is cylindrical as a rule, on its jacket face in the course of one or more revolutions of the workpiece receptacle about the receptacle axis. The tumbling motion that exists is recorded. From the path that the blank takes, the location of the workpiece axis can be calculated relative to the receptacle axis. The receptacle axis and the workpiece axis need not intersect one another. The location of the workpiece axis to the receptacle axis is determined by two vectors $x_0$, $r_0$. The two vectors characterize the eccentricity and the misalignment of the two axes to one another.

The control unit converts the position of the blank, taking these vectors into account, into the machine coordinate system and takes this into account in triggering suitable control motors, which are associated with the various directions of motion (axes) of the components, that is, of the grinding head or of the workpiece holder of the grinding machine. Taking this into account can be done in such a way that the existing and previously determined commands for the actions of the individual control motors of the individual axes are modified. However, it can also be done in such a way that the tumbling motion of the workpiece is taken into account in advance when creating the individual control commands for the control motors. This last can be done by setting up a transformation specification T, which converts the kinematic transformation of a point PW in the workpiece coordinate system into a point PM of the machine coordinate system (PM=T (PW)), taking the vectors $x_0$, $r_0$ into account. The new transformation Tnew (T, $x_0$, $r_0$) is then in turn used for converting (copying) a point PW in the workpiece coordinate system into a point PM in the machine coordinate system; PM=Tnew (PW). It should be noted that the vectors $x_0$, $r_0$ are dependent on the coordinate C of the machine coordinate system that describes a rotation of the receptacle about the receptacle axis.

The determination of the vectors $x_0$, $r_0$ is preferably done at the beginning of each machining operation on the still unmachined blank. For each machining operation, an individual transformation specification Tnew (T, $x_0$, $r_0$) is therefore set up. Thus for the individual blanks, different chucks can be used, whose accuracy is no longer critical. Even with very inexpensive chucks, highly precisely machined tools can thus be produced, whose ground cutting edges and other functional faces are positioned in the very best way possible to the tool axis. The tool axis is defined by the predetermined tool shaft on the blank. The latter can be shaped cylindrically or conically. Precise concentricity in precision chucks is assured, even though the workpiece may have been ground in a substantially less-precise chuck.

Figure 2:
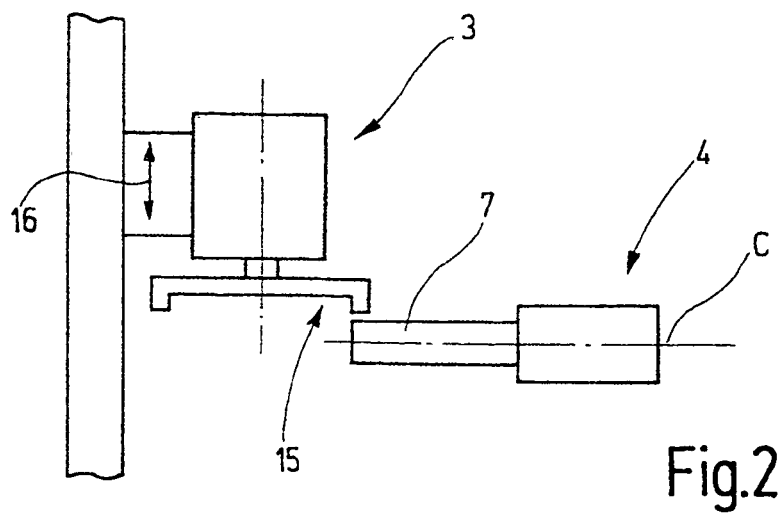
Figure 3:
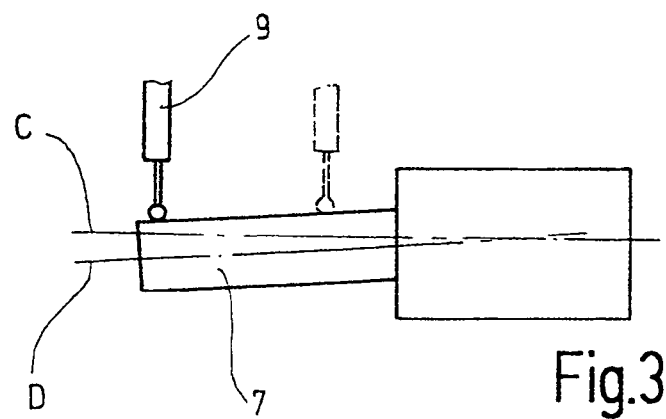
Figure 4:
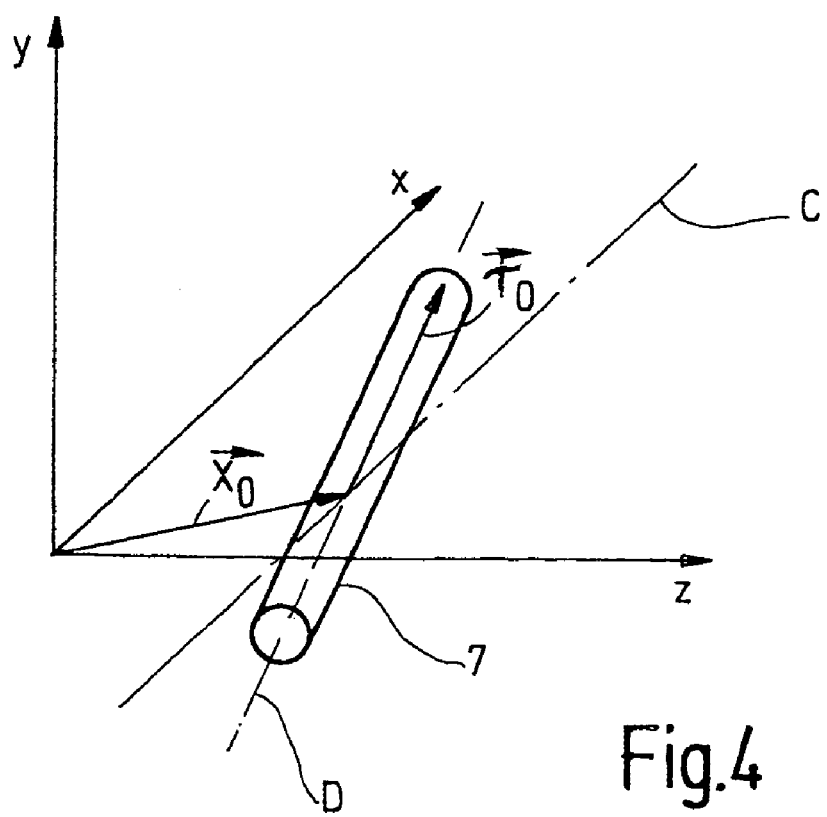
Figure 5:
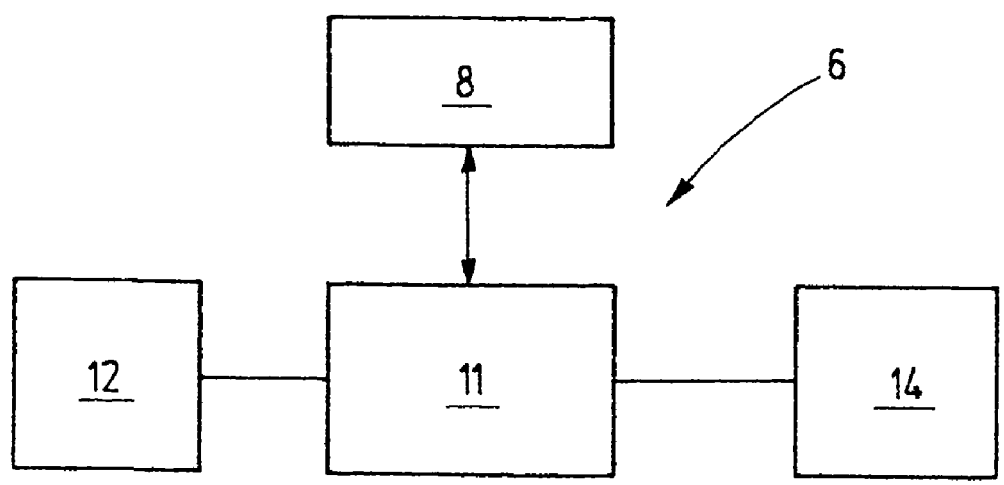

Further details of advantageous embodiments of the invention will become apparent from the drawings, the description, and the claims. In the drawings, one exemplary embodiment of the invention is shown. Shown are FIG. 1, an extremely schematic illustration of a tool grinding machine;

FIG. 2, a top view on the tool holder and the grinding head;

FIG. 3, a schematic view of the tool holder and a clamped blank during the initial measurement;

FIG. 4, a schematic, exaggerated view of the machine coordinate system and the position of the blank in it; and FIG. 5, a block circuit diagram of the machine controller of the grinding machine of FIG. 1.

In FIG. 1, a tool grinding machine 1 is shown in a schematic illustration. It includes a machine frame 2, which carries a grinding head 3 and a tool holder 4. As schematically indicated in FIG. 1 by arrows, the tool holder 4 and the grinding head 3 ate adjustable relative to one another in three coordinate directions X, Y and Z. The corresponding guides for the X direction, the Y direction and the Z direction, and the drive mechanisms not otherwise shown for moving the tool holder 4 or the grinding head 3 in these directions are represented here as "axes" or "CNC axes". The tool holder 4 is furthermore pivotably supported about a vertical axis B. The tool holder 4 furthermore has a workpiece receptacle 5, which is rotatable about a receptacle axis C. The motions along all the directions X, Y, Z and about the axes B and C are monitored, or in other words controlled/regulated, by a machine control unit 6, as schematically shown in FIG. 5.

The grinding head 3 serves to produce the desired workpiece, such as a drill or milling cutter or the like, from a blank 7 that is held in the workpiece receptacle 5. The blank 7 is preferably a cylindrical body. As FIG. 3 shows, it is as a rule clamped by the workpiece receptacle 5 not entirely coaxially with the receptacle axis C. Instead, the axis of symmetry of the cylindrical blank 7, or in other words the workpiece axis D, deviates from the receptacle axis C. As a rule, the deviation is stochastic, and it is all the greater, the lower the accuracy of the workpiece receptacle 5 is. The receptacle axis C and the workpiece axis D need not intersect one another at all; that is, they can be skewed relative to one another. Upon a rotation of the blank 7 about the receptacle axis C, the blank 7 executes a tumbling motion.

The machine control unit 6 has a measurement module 8, to which one or more measuring tracers 9 (FIG. 3) or other measuring means belong that are capable of detecting the position of the blank 7. If tracers 9 are used, they serve for instance, during one or more revolutions of the blank 7, to trace the blank on its outer circumference, or in other words its jacket face, for instance at various points. It is for instance possible to trace a blank at three or more points on its circumference, by providing that from one tracing operation to another it is rotated in each case about a fixed angular amount about the receptacle axis C and then traced again. If the tracing operation is done over multiple rotations, periodic errors whose period extends over a plurality of revolutions of the blank and which originate for instance in the drive gear or in ball bearings, can also be detected. The measurement module 8 also includes an evaluation program, which on the basis of new measurement points obtained draws a conclusion about the location of the workpiece axis D. The tracing operations may, as indicated by dashed lines in FIG. 3, be performed at a plurality of places spaced apart axially from one another with respect to the receptacle axis C.

The measurement module 8 also serves, on the basis of the measurement values obtained, to draw a conclusion about the eccentricity and the misalignment with which the blank 7 is held relative to the receptacle axis C. The eccentricity and the misalignment can be described by vectors $x_0$, $r_0$, as are shown greatly exaggerated in FIG. 4. The blank 7 is adjusted in a skewed fashion to the receptacle axis C. The concentricity error is described by an orientation vector $r_0$, which is located parallel to the center axis of the blank 7 or some other workpiece, and a further vector $x_0$, which describes the offset of the workpiece from the ideal position. The vectors $x_0$, $r_0$ ascertained by the measurement module 8 are transferred to a computation module 11, with which the coordinates of the workpiece or blank 7 are converted from a workpiece-specific coordinate system into the machine coordinate system X, Y, Z, B, C. In addition to the usual transformation T with which a given point PW in the tool coordinate system is to be converted into a point PM in the machine coordinate system if no tumbling motion is occurring, or in other words, when the vector $r_0$ has the same direction as the receptacle axis C and when the vector $x_0$ disappears (is zero), the transformation Tnew now takes into account the vectors $x_0$, $r_0$ (Tnew (T, $x_0$, $r_0$)) as well. The computation module, which may be formed by a program running in the machine control unit 6, receives data or commands from a control module 12 that can be considered as positioning commands for the individual guide motors associated with the axes X, Y, Z, B and C. These control commands are modified by the computation module 11 and sent onward, as corrected control commands, to the drive mechanisms 14.

The tool grinding machine described thus far functions as follows:

For machining a workpiece, or in other words for producing a tool from a blank 7, first the blank 7 is clamped in the workpiece receptacle 5 and measured in it. To that end, the computation module 11 initially triggers the appropriate drive mechanism of the tool holder 4 such that the blank 7 is rotated in increments about the receptacle axis C. The tracer 9, which may be connected to the grinding head 3 or guided in some other way, traces the jacket face of the blank 7 at various places in the same axial position and furnishes the corresponding measurement values to the computation module 11. After at least one but preferably a plurality of revolutions of the blank 7, the tracer 9 is axially adjusted, in order to trace the blank 7 again along its circumference. To that end, the computation module 11 causes the blank 7 to rotate onward in increments. If needed, the blank 7 can be traced at further places.

Once the at least two axially spaced-apart annular regions of the blank 7 have been traced, then from that, the measurement module 8 or the computation module 9 calculates the vectors $x_0$, $r_0$, which characterize the eccentricity and the misorientation of the blank 7. The two vectors $x_0$, $r_0$ are then kept in readiness individually for the workpiece or blank 7 that has just been measured and are further used for transforming the workpiece-related coordinates into the machine-related coordinates.

If the blank 7 is then to be machined in a grinding machining operation, as indicated in FIG. 2, and if a cylindrical face is for instance to be created, then the grinding head 3 is brought as FIG. 2 shows to the blank 7. For creating the cylindrical face, the blank 7 is rotated about the receptacle axis C while the grinding wheel 15 is in engagement with it. The wobble runout of the blank 7 has been determined in the previous measurement operation and stored in memory by the machine control unit 6. The control unit now takes the wobble runout into account in triggering the grinding head 3, so that the grinding head executes a reciprocating motion, as indicated by the arrow 16 in FIG. 2. The motion is adapted such that the circle on the blank 7 described by the point of contact between the grinding wheel 15 and the circumference of the blank 7 is located concentrically to its workpiece axis D. It is therefore possible, regardless of clamping inaccuracies on the part of the workpiece receptacle 15, to create cylindrical faces on the blank 7 which are concentric and dimensionally accurate relative to the workpiece axis D.

Other surfaces, such as flanks, faces, and cutting edges, can also be created symmetrically and precisely relative to the location of the workpiece axis D.

A tool grinding machine 1 has a machine control unit 6, which by means of a suitable measuring device, which for instance comprises a tracer 9 and a measuring module 8, first determines the wobble runout with respect to the ideal receptacle axis C of a workpiece receptacle. In the grinding machining of the blank 7 or a workpiece, this wobble runout is taken into account and compensated for; that is, the grinding tools are made to track a tumbling workpiece in such a way that the workpiece is machined to the exact intended dimensions and concentrically.

The invention claimed is:

1. A tool grinding machine, comprising:
    a workpiece receptacle, which is arranged for receiving an elongated rotationally symmetrical blank having an axis of symmetry;
    a tool holder, which is arranged for rotating the workpiece receptacle about a predetermined receptacle axis, and a rotary position detection device is arranged for monitoring the angular position of the workpiece receptacle about the receptacle axis, which are-connected in relation to the workpiece receptacle;
    a grinding head which has a rotary drive mechanism and carries at least one grinding tool;
    a positioning device, which is connected to at least one of the workpiece receptacle and the grinding head, for effecting a relative motion between the grinding tool and the blank;

at least one measuring device, which is arranged for determining the location of the axis of symmetry of the blank; and a machine control unit, which is connected to the tool holder, the rotary position detection device, the positioning device, and the measuring device, and which has a computation module, which determines control commands for the positioning device, taking into account the location of the axis of symmetry of the blank and the angular position of the receptacle about the receptacle axis to grind the blank about the axis of symmetry of the blank.

2. The grinding machine as recited in claim 1, wherein the measuring device includes at least one measuring tracer, with which the blank is traced at the plurality of places spaced apart from one another in the axial direction.

3. The grinding machine as recited in claim 1, wherein the measuring device includes at least one measuring tracer, with which the blank is traced at a plurality of places spaced apart from one another in the circumferential direction.

4. The grinding machine as recited in claim 1, wherein for determining the location of the axis of symmetry of the blank with respect to the receptacle axis, the blank is rotated in increments and in the process traced initially in a first axial position and then in at least one other axial position.

5. The grinding machine as recited in claim 1, wherein the computation module determines control commands from measured values obtained of two vectors $(x_0, r_0)$, which characterize an amount of deviation of the axis of symmetry of the blank from the receptacle axis and the orientation of the axis of symmetry of the blank relative to the receptacle axis.

6. The grinding machine as recited in claim 5, wherein the computation module converts the blank coordinates, in the course of a coordinate transformation, into machine coordinates and in the transformation takes the vectors $(x_0, r_0)$ into account.

7. The grinding machine as recited in claim 5, wherein the determination of the location of the axis of symmetry of the blank with respect to the receptacle axis is done on the basis of the determination of the vectors after each clamping operation, in which the blank has been clamped in the workpiece receptacle.

8. A method for controlling a tool grinding machine, comprising:
    providing a workpiece receptacle, which is arranged for receiving an elongated rotationally symmetrical blank having an axis of symmetry;
    providing a tool holder, which is arranged for rotating the workpiece receptacle about a predetermined receptacle axis, and a rotary position detection device which is arranged for monitoring the angular position of the workpiece receptacle about the receptacle axis, which are connected to the workpiece receptacle;
    providing a grinding head which has a rotary drive mechanism and carries at least one grinding tool;
    providing a positioning device, which is connected to at least one of the workpiece receptacle and the grinding head, for effecting a relative motion between the grinding tool and the blank;
    providing at least one measuring device, which is arranged to measure the blank at a plurality of places spaced apart from one another in an axial direction for determining the location of the axis of symmetry of the blank; and
    providing a machine control unit, which is connected to the tool holder, the rotary position detection device, the positioning device, and the measuring device, and which has a computation module, which determines control commands for the positioning device, taking into account the location of the axis of symmetry of the blank and the angular position of the receptacle about the receptacle axis to grind the blank about the axis of symmetry of the blank.

9. The method as recited in claim 8, wherein the measuring device includes at least one measuring tracer, with which the blank is traced at the plurality of places spaced apart from one another in the axial direction.

10. The method as recited in claim 8, wherein the measuring device includes at least one measuring tracer, with which the blank is traced at a plurality of places spaced apart from one another in the circumferential direction.

11. The method as recited in claim 8, wherein for determining the location of the axis of symmetry of the blank with respect to the receptacle axis, the blank is rotated in increments and in the process traced initially in a first axial position and then in at least one other axial position.

12. The method as recited in claim 8, wherein by means of the computation module, two vectors $(x_0, r_0)$ are determined from measurement values obtained, which vectors characterize an amount of deviation of the axis of symmetry of the blank from the receptacle axis and the orientation of the axis of symmetry of the blank relative to the receptacle axis.

13. The method as recited in claim 12, wherein the computation module converts blank coordinates, in the course of a coordinate transformation, into machine coordinates and in this transformation takes the vectors $(x_0, r_0)$ into account.

14. The method as recited in claim 8, wherein the determination of the location of the axis of symmetry of the blank with respect to the receptacle axis is done on the basis of the determination of the vectors after each clamping operation, in which the blank has been clamped in the workpiece receptacle.

15. A method for controlling a tool grinding machine having a grinding head in order to grind a rotationally symmetrical blank comprising:
    clamping the blank in a workpiece receptacle, wherein the blank has an axis of symmetry, and wherein said workpiece receptacle is rotatable about a predetermined receptacle axis;
    rotating the blank in the workpiece receptacle about the receptacle axis;
    tracing, at a first axial location of said blank, a first outer circumference of the rotating blank;
    tracing, at a second axial location of said blank, a second outer circumference of the rotating blank;
    determining, from the first and second outer circumferences, the location of the axis of symmetry of the blank;
    moving the grinding head to contact and grind the blank taking into account the location of the axis of symmetry of the blank.

16. The method as recited in claim 15, wherein the step of determining the location of the axis of symmetry of the blank further comprises determining two vectors $(x_0, r_0)$, which vectors characterize an amount of deviation of the axis of symmetry of the blank from the receptacle axis and the orientation of the axis of symmetry of the blank relative to the receptacle axis.

17. The method as recited in claim 16, wherein the wherein the step of determining the location of the axis of symmetry of the blank further comprises converting blank coordinates, in the course of a coordinate transformation, into machine coordinates, said transformation taking the vectors $(x_0, r_0)$ into account.

* * * * *